(12) United States Patent
DeMarco

(10) Patent No.: US 6,237,309 B1
(45) Date of Patent: May 29, 2001

(54) APPARATUS FOR FORMING SAND BAGS

(76) Inventor: Paul C. DeMarco, 545 Pine Rd., Hammonton, NJ (US) 08037

( * ) Notice: Subject to any disclaimer, the term of this patent is extended or adjusted under 35 U.S.C. 154(b) by 0 days.

(21) Appl. No.: 09/328,732

(22) Filed: Jun. 9, 1999

(51) Int. Cl.⁷ .................................................. B65B 3/28
(52) U.S. Cl. ............................... 53/502; 53/202; 53/576; 141/83; 141/231; 141/314
(58) Field of Search ............................... 53/502, 576, 459, 53/469, 202, 284.7, 391; 141/83, 231, 313, 314, 316

(56) References Cited

U.S. PATENT DOCUMENTS

| | | |
|---|---|---|
| 2,656,658 * | 10/1953 | Grady ........................................ 53/576 |
| 3,552,346 | 1/1971 | Garden . |
| 3,940,906 * | 3/1976 | Leckband et al. ....................... 53/576 |
| 4,044,525 * | 8/1977 | Forsgren ................................. 53/576 |
| 4,044,921 | 8/1977 | Caverly . |
| 4,184,522 | 1/1980 | Waite . |
| 4,790,124 * | 12/1988 | Kaji ........................................ 53/576 |
| 5,121,775 | 6/1992 | McClain . |
| 5,353,851 | 10/1994 | Cline . |
| 5,575,315 | 11/1996 | Wengert . |
| 5,673,734 | 10/1997 | Hawley . |
| 5,687,781 | 11/1997 | Grizz . |
| 5,771,665 | 6/1998 | Nelson et al. . |
| 5,802,807 | 9/1998 | Johnson . |
| 5,806,576 | 9/1998 | Sutherlin . |
| 5,832,700 * | 11/1998 | Kammler et al. ....................... 53/502 |
| 5,893,260 * | 4/1999 | McKenna ............................... 53/551 |
| 5,979,512 * | 11/1999 | McGregor et al. ..................... 53/502 |

* cited by examiner

Primary Examiner—Stephen F. Gerrity
(74) Attorney, Agent, or Firm—Dale J. Ream

(57) ABSTRACT

A sand bagging device comprises a portable support having a hopper mounted thereto to store sand for bagging. The device includes a bagging station mounted to the hopper having a chute extending therefrom. A cartridge of continuous bagging material is removably mounted to the chute. A scale is adjustably mounted below the chute which can selectably accommodate bags of different weights and heights. Sand flows into the chute from the hopper and is allowed to fill the bag material to a predetermined weight. A sealing member cuts and seals the bagging material into a discrete bag of sand.

15 Claims, 6 Drawing Sheets

APPARATUS FOR FORMING SAND BAGS

BACKGROUND OF THE INVENTION

This invention relates to an apparatus for dispensing a granular material into bags and, more particularly, to a portable station for forming separate sand bags by filling a portion of continuous bag material with sand and then cutting and sealing the material.

The efficient filling and sealing of sand bags is of great importance during times of emergency, such as extreme flooding. As time is of the essence during a flood emergency, sand bags must be filled and sealed efficiently. Further, sand bags need to be relatively uniform in size when stacked for the damming of water.

Various devices exist for filling and sealing bags with sand. Although assumably effective in operation, existing devices still exhibit certain disadvantages. Some devices require manual operation either for filling or sealing the bag. Other devices require large supporting structures or must be mounted to a large truck in order to be portable.

It is therefore desirable to have an apparatus for filling sand bags that is easily movable to selected emergency locations. Further, it is desirable to have an apparatus for forming sand bags from a continuous length of bagging material. It is also desirable to have an apparatus which can selectively form sand bags having various weights without wasting bag material.

SUMMARY OF THE INVENTION

Accordingly, I have invented a portable sand bag filling apparatus which utilizes a portable support frame having a hopper for storing sand for bagging. The apparatus includes a plurality of bagging stations mounted to the hopper. Each bagging station includes a chute into which sand is delivered from the hopper. A cartridge of continuous bagging material is removably mounted to each chute for receiving sand flowing therethrough. Each bagging station further includes a scale for determining when a predetermined weight of sand has been received in a bag. A cutter/sealer is attached to each bagging station for first severing a filled sand bag from the continuous bagging material and then sealing the top of the bag and the bottom of the remaining bagging material.

It is therefore a general object of this invention to provide an apparatus for filling sandbags which can form and fill bags with sand quickly and efficiently.

Another object of this invention is to provide an apparatus, as aforesaid, which can form and fill sand bags automatically.

Still another object of this invention is to provide an apparatus, as aforesaid, which can be towed behind a truck or tractor to a selected location.

Yet another object of this invention is to provide an apparatus, as aforesaid, which includes a hopper that can be filled easily by a tractor or dump truck.

A further object of this invention is to provide an apparatus, as aforesaid, which can dispense sand into a portion of a continuous length of sturdy bag material.

A still further object of this invention is to provide an apparatus, as aforesaid, which fills a sandbag to a predetermined weight.

A particular object of this invention is to provide an apparatus, as aforesaid, which severs a filled sandbag from the continuous length of bag material.

Another particular object of this invention is to provide an apparatus, as aforesaid, which heat seals both the top of the severed bag and the bottom of the remaining continuous length of bag material.

A further object of this invention is to provide an apparatus, as aforesaid, which is powered by an on-board motor or by the power take-off of a tractor.

A still further object of this invention is to provide an apparatus, as aforesaid, in which the continuous length of bag material is provided by an easily replaceable cartridge.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
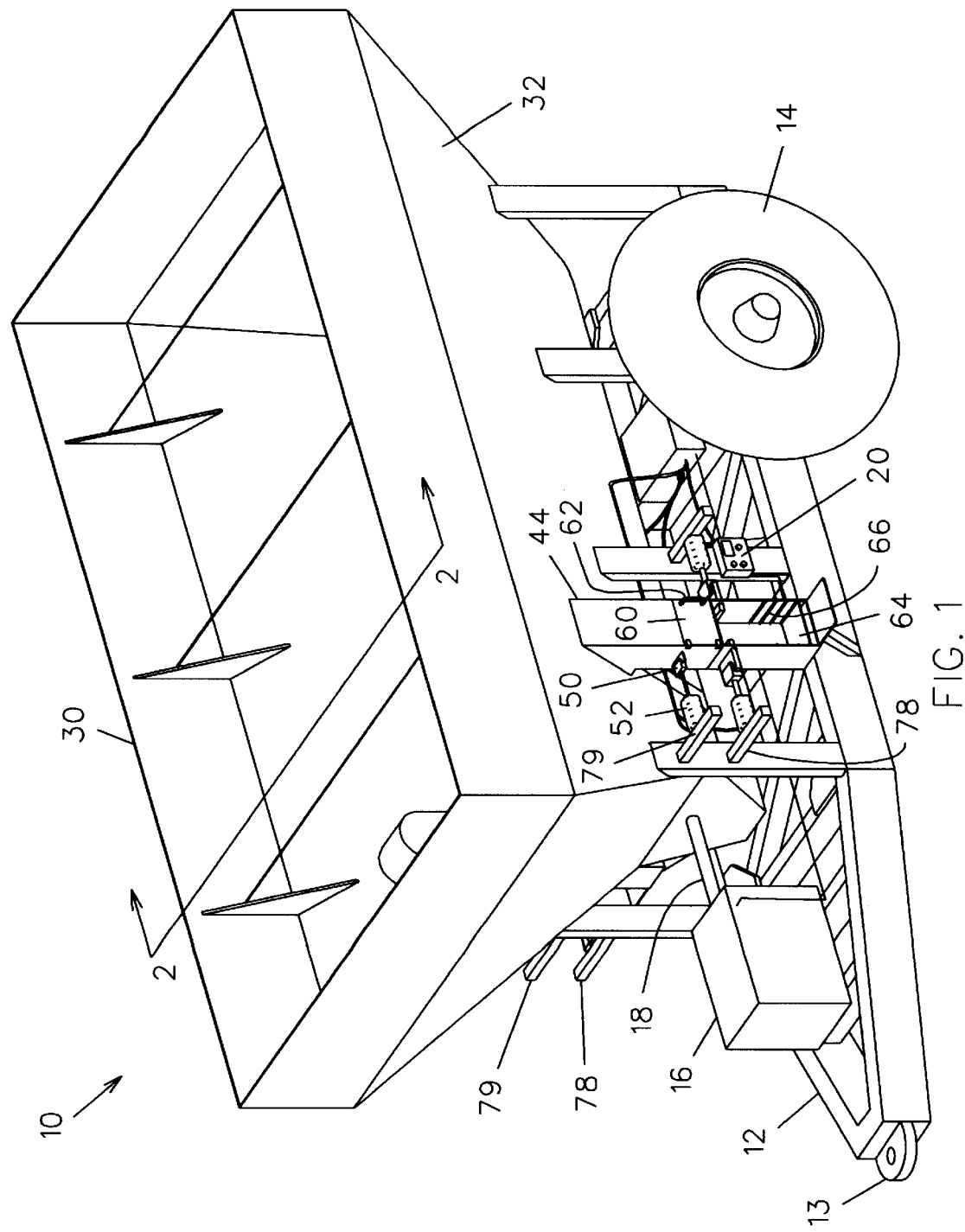
FIG. 1 is a perspective view of the sand bag filling apparatus according to the present invention.

Turning more particularly to the drawings, FIG. 1 shows a portable sand bagging apparatus 10 constructed according to a preferred embodiment of the present invention. The apparatus 10 includes a trailer frame 12 having a hitch 13 for connection to a truck or tractor. A pair of wheels 14 (only one is shown) are axially mounted to the frame 12 such that the apparatus 10 may be quickly moved to a desired location for use. An engine 16 is mounted on the frame 12 which powers the augers 38, 40 (as in FIG. 2) with a drive shaft 18. A control unit 20 is coupled to the engine 16 with a wire 22 and regulates operation of the augers 38, 40. The augers 38, 40 could also be driven by connection to the crank shaft of a tractor.

The apparatus 10 further includes a hopper 30 mounted to the frame 12 for receiving and storing sand or other particulate material. The hopper 30 has sloped sides 32 for directing material downward into a trough.

Figure 2:
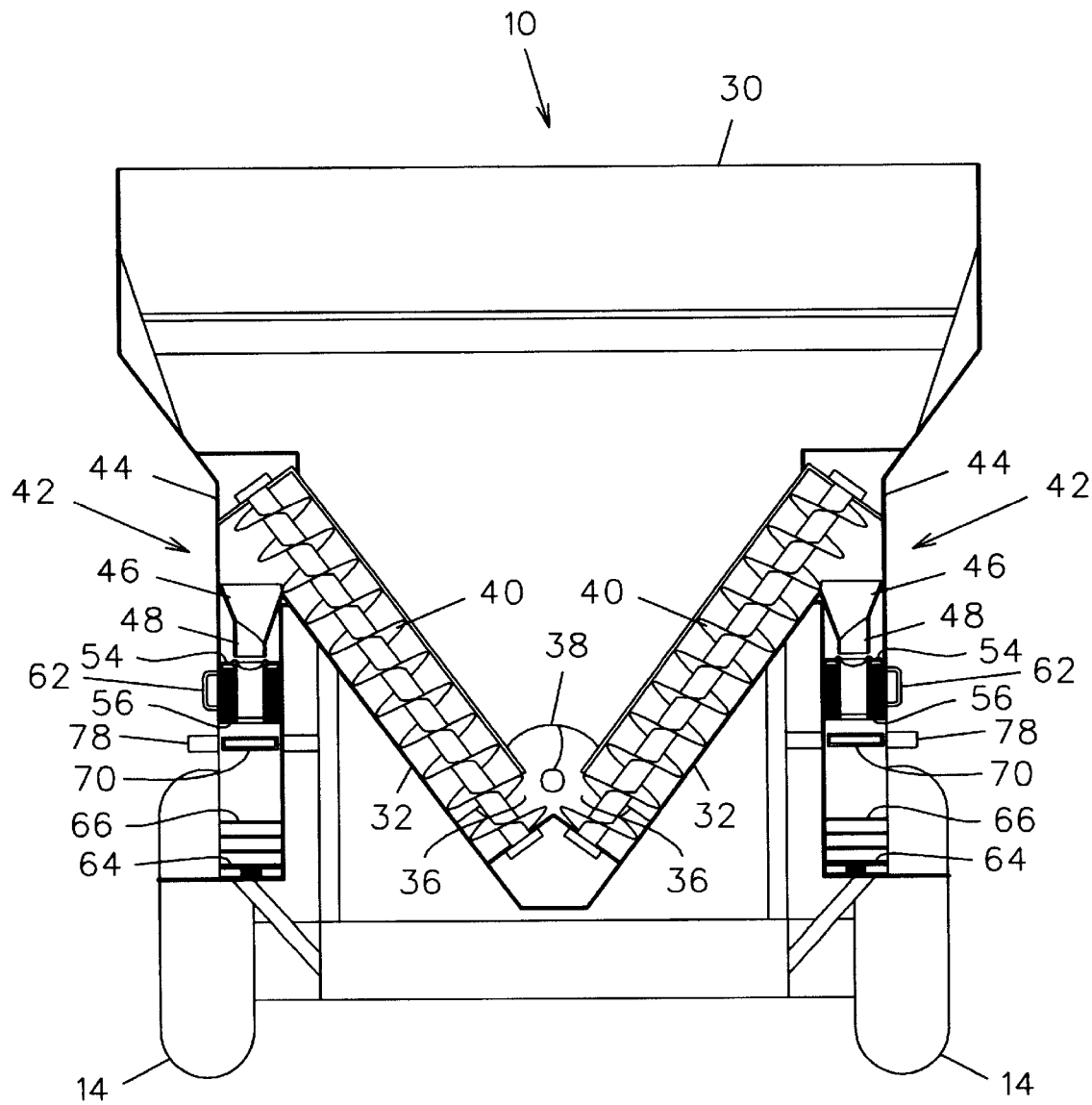
FIG. 2 is a sectional view of the apparatus taken along line 2—2 of FIG. 1.

As seen in FIG. 2, a first auger 38 positioned within the trough operates to transfer the material into a staging area 36 near the front of the hopper 30. A pair of augers 40 are mounted within the hopper 30 adjacent opposed sides 32 and are positioned to carry sand from the staging area 36 to bagging stations 42. While a pair of oppositely disposed bagging stations 42 are illustrated in FIG. 2, it is understood that any number of bagging stations having identical constructions may be included.

Figure 3:
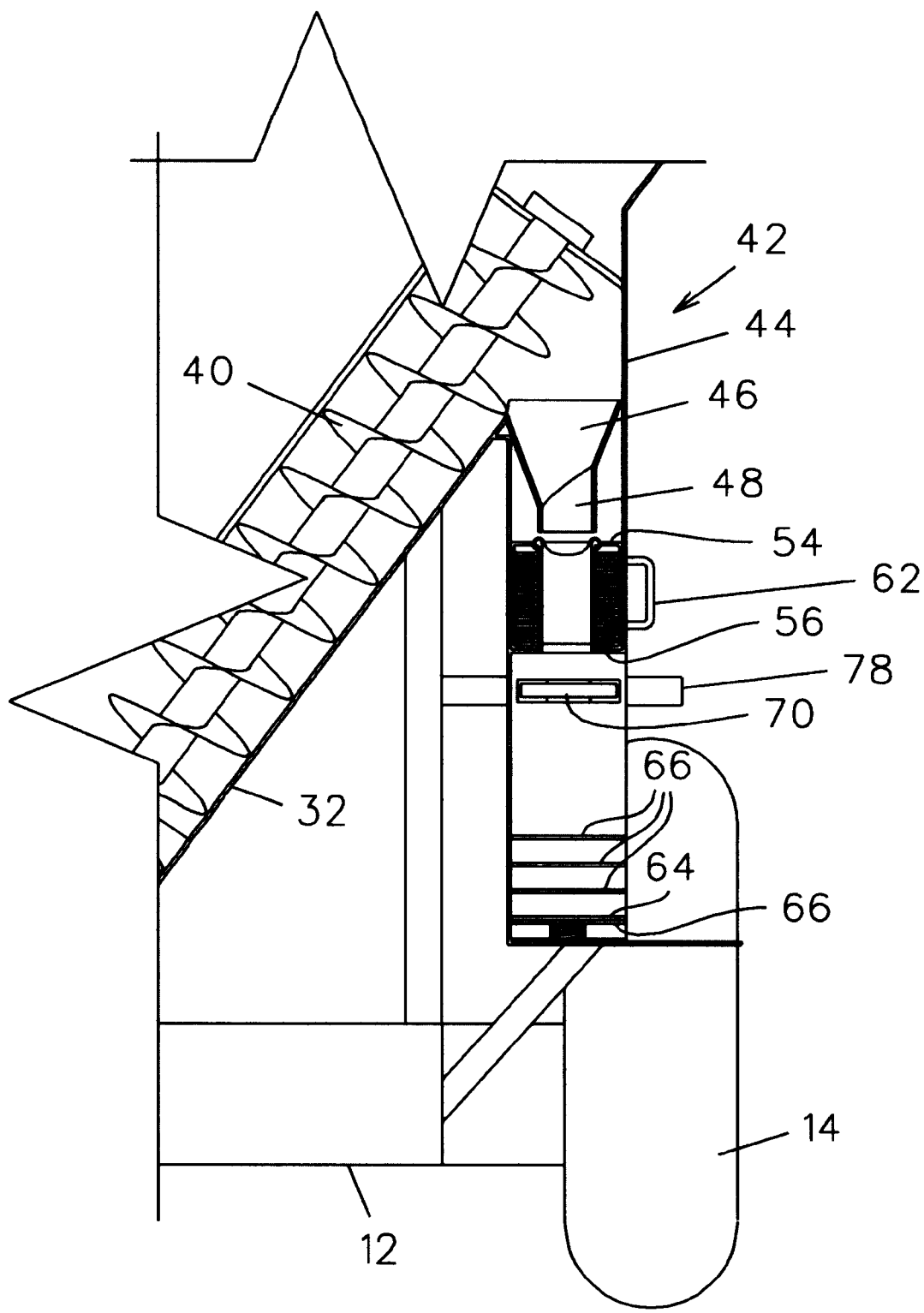
FIG. 3 is a partial view of the apparatus of FIG. 2 on an enlarged scale.
Figure 4:
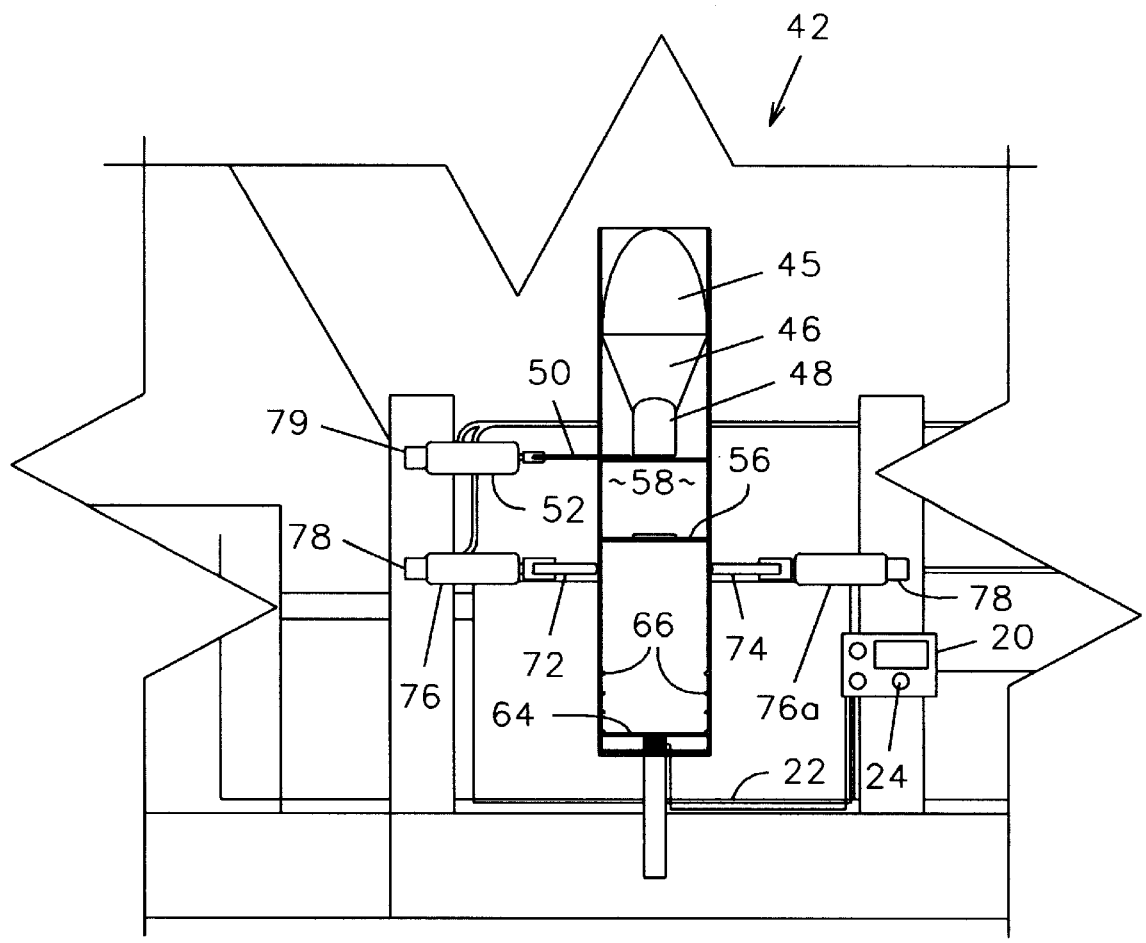
FIG. 4 is a partial, side view of the apparatus of FIG. 1 with a bagging station side wall broken away and bag cartridge removed, for clarity.

Each bagging station 42 includes a chute 44 extending downwardly from a side wall 32 of the hopper 30. Each auger 40 is in communication with the upper end of a chute 44 for delivering sand through an aperture 45 therein during operation. Each chute 44 includes a funnel 46 having an offset portion 48 which reduces the velocity and force of sand communicated therethrough and hence prevents damage to a scale 64 mounted therebelow (FIG. 3). A gate 50 positioned immediately beneath the funnel 46 is coupled to a piston/cylinder combination 52 which slidably operates said gate 50 between open and closed positions for regulating the flow of sand therethrough (FIG. 4). The piston/cylinder combination is connected to a support arm 79 of the frame 12.

Figure 5:
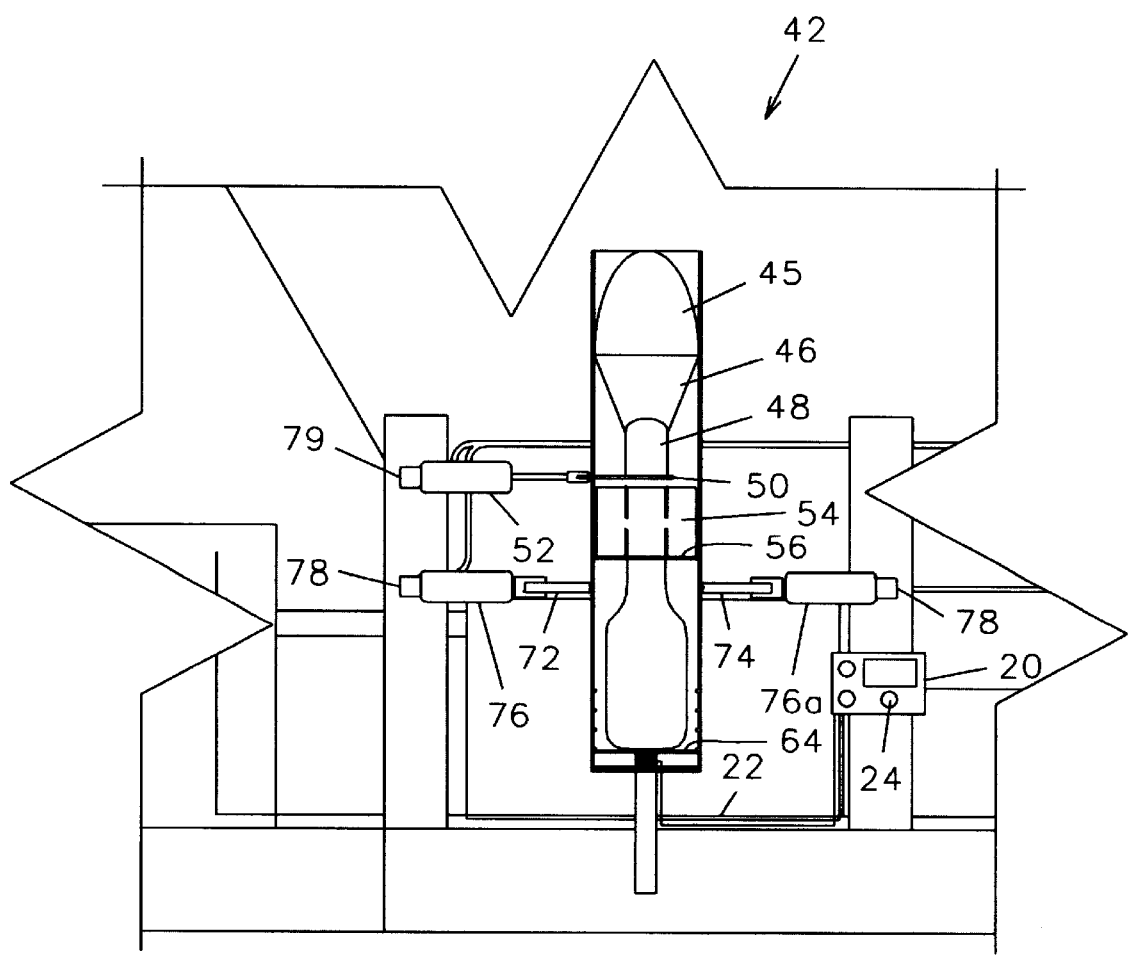
FIG. 5 shows the apparatus of FIG. 4 as configured after the filling of a sand bag with the dashed lines illustrating the flow of sand through the cartridge.

A cartridge 54 of continuous bagging material is removably mounted on a support 56 within a compartment 58 in the chute 44. The bagging material is an elongated cylinder of sturdy material initially having an open top and closed bottom. The material is packed within the cartridge 54 such that the closed bottom is on the bottom of the stack of material. The bottom of the material is pulled downward by the sand's weight through an aperture in the support 56 as sand flows therein (FIG. 5). As shown in FIG. 1, the chute 44 further includes an access door 60 with a handle 62 for obtaining access to the compartment 58, for example to replace a cartridge 54.

The lower portion of the chute 44 includes a plurality of opposed pairs of support flanges 66 upon which a scale 64 is selectably mounted. The scale 64 is therefore height adjustable to accommodate bags of different weights. As the bag material is filled with sand, the closed bottom of the bag bears against the scale 64 (FIG. 5). A control unit 20, as seen in FIG. 1, coupled to the scale 64 signals the piston/cylinder combination 52 to close the gate 50 and disengage the augers 38, 40 when a predetermined weight of sand is detected by the scale 64. The adjustability of the scale 64 allows the amount of bag material that is left unused following a cutting and sealing thereof to be regulated, as to be further described below.

Figure 6:
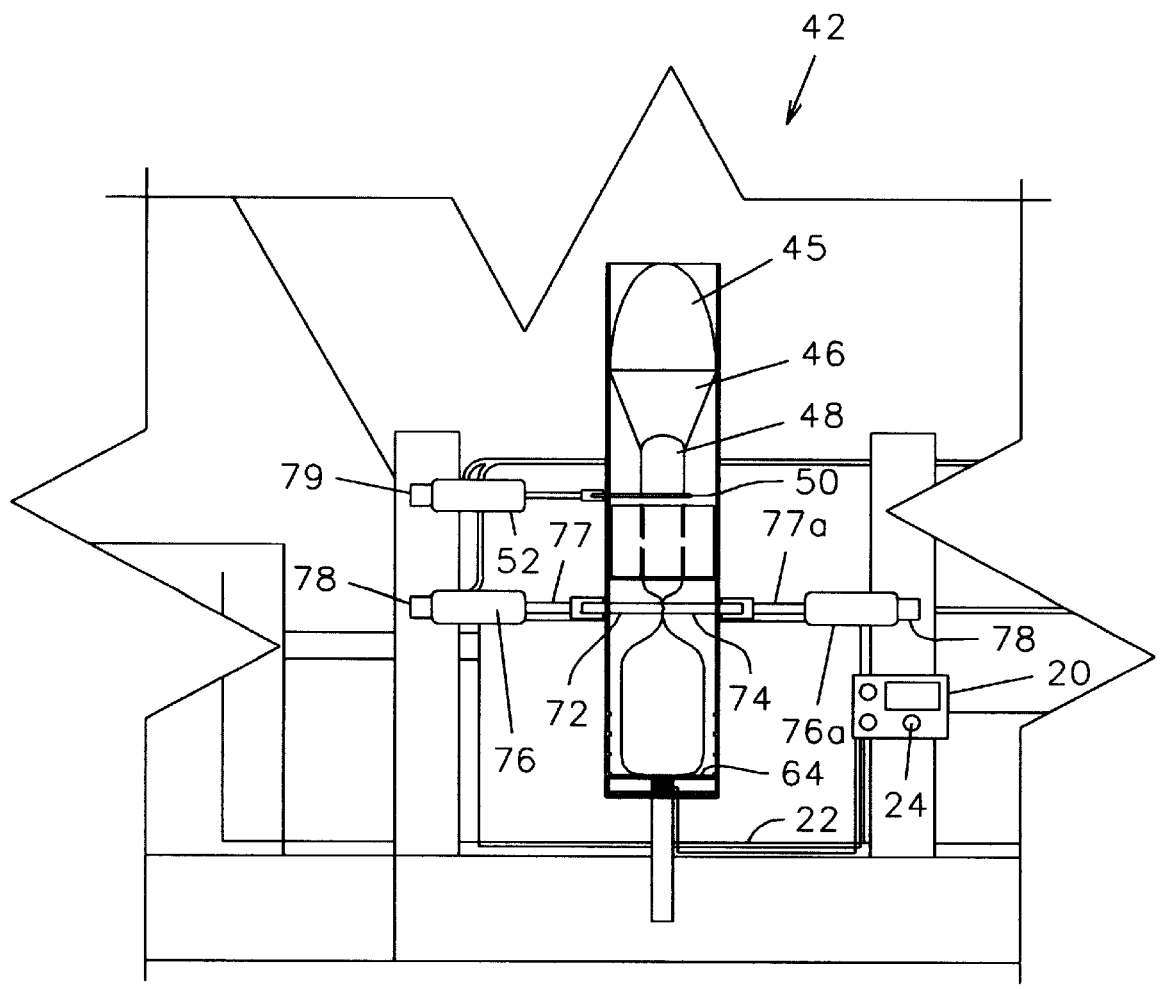
FIG. 6 shows the apparatus of FIG. 4 as configured during a cutting and sealing of a sand bag.

As in FIGS. 4–6, the apparatus 10 further includes a cutter/sealer 70 having first 72 and second 74 portions for first severing a filled bag from the continuous bagging material and then sealing both the open top of the filled bag and the bottom of the continuous material. A pair of piston/cylinder combinations having pistons 76, 76a and rods 77, 77a are connected to support arms 78 of the frame 12. Rods 77, 77a are attached to first 72 and second 74 portions of the cutter/sealer 70 and are utilized to move first 72 and second 74 portions of the cutter/sealer 70 from a first spaced apart position which allows sand to pass into the bagging material (FIG. 5) to a second position wherein first 72 and second 74 portions of the cutter/sealer 70 close when a sand bag has been filled (FIG. 6). Upon closing, the cutter/sealer 70 cuts the bagging material and thermally seals the cut ends thereof.

In operation, a user prepares the bagging apparatus 10 for operation by inserting a cartridge 54 of continuous bagging material into compartment 58 in the chute 44. The user also determines the desired bag weight and sets the control unit 20 accordingly. The hopper 30 may be filled with sand or other particulate material using the front end loader of a tractor or directly from a dump truck. The engine 16 is activated with a start/stop button 24 on the control unit 20 which in turn activates the augers 38, 40 to deliver sand to each bagging station 42. Sand is allowed to flow through the open gate 50 beneath the funnel 46 and begins to fill the continuous bagging material of the cartridge 54. The weight of the sand causes the closed bottom of the bagging material to engage the scale 64 (FIG. 5).

The control unit 20 is coupled with wires 22 to the scale 64 and to the piston/cylinder combinations 38, 40 of the cutter/sealer 70 and gate 50, respectively. When the selected bag weight is reached, the control unit 20 suspends operation of the augers 38, 40, closes the gate 50 within the chute 44, and initiates the cutting and sealing operation described above. The filled and sealed sandbag may then be removed from the bagging station 42.

It should be appreciated that the height of the scale 64 within the chute 44 may be adjusted according to the selected bag weight. For example, the scale 64 should be placed in a raised position if a low bag weight is selected so that a significant amount of bag material is not left unfilled following a cutting and sealing operation by the cutter/sealer 70.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A bagging device for particulate, comprising:
    a portable support;
    a hopper securably mounted to said support adapted to store particulate for bagging, said hopper having sloped opposing side walls for directing material downward into a trough;
    a pair of chutes extending from said opposing side walls of said hopper;
    a pair of augers mounted in said hopper and adapted to deliver particulate from said trough to corresponding chutes;
    a bag cartridge of continuous bagging material removably mounted to each chute, each chute having a funnel with an offset portion for reducing the velocity and force of particulate flowing therethrough;
    each bag cartridge including means for sealing said bagging material into discrete bags, said bags for receiving particulate dispensed from said hopper through said pair of chutes.

2. A bagging device as claimed in claim 1 includes a scale means positioned beneath each chute for weighing a bag of particulate thereon.

3. A bagging device as claimed in claim 2 wherein each said chute includes pairs of opposed flanges adapted to support respective scale means a selected distance below respective sealing means and regulate the amount of said bag material used in forming sand bags of different weights.

4. A bagging device as claimed in claim 2 wherein said continuous bagging material of each said bag cartridge includes a closed end engaging corresponding scale means as particulate material from said hopper is dispensed through a corresponding chute into said continuous bagging material.

5. A bagging device as claimed in claim 1 wherein each said means for sealing comprises a cutting member to sever one said discrete bag from said continuous bagging material of a respective bag cartridge after receiving a pre-selected amount of particulate therein and a sealing member to thermally seal said one discrete bag and said continuous bagging material.

6. A bagging device as claimed in claim 5 wherein each said means for sealing includes:
    first and second piston assemblies connected to said portable support, each piston assembly including a piston and a rod;
    a respective cutting member attached to said rod of said first piston assembly;

a respective sealing member attached to said rod of said second piston assembly;

said rods causing said respective cutting and sealing members to reciprocate between a first spaced apart position allowing sand to pass into said continuous bagging material and a second position in which said respective cutting and sealing members bear against the other to cut and seal said bagging material into said one discrete bag.

7. A bagging device as claimed in claim 1 wherein each of said pair of chutes includes a gate mounted above a corresponding bag cartridge therein, said gate selectably movable between a first open position and a second closed position for regulating the flow of particulate material through a corresponding chute into said corresponding bag cartridge.

8. A bagging device as claimed in claim 1 wherein said portable support is a trailer.

9. A sand bagging device, comprising:

a portable support;

a hopper securably mounted to said support, adapted to store sand for bagging, said hopper having sloped opposing side walls for directing sand downward into a trough;

a pair of chutes extending from said opposing side walls of said hopper;

a pair of augers mounted in said hopper and adapted to deliver sand from said trough to corresponding chutes;

continuous bag material removably mounted to each said chute;

a scale disposed in each chute for weighing a bag of sand;

said bagging material adapted to form a plurality of discrete bags for receiving sand dispensed from said hopper through said pair of chutes to predetermined weights as determined by said scale;

a plurality of opposed pairs of support flanges positioned in each chute each pair of flanges adapted to support a corresponding scale at a selected height within a respective chute before sand is dispensed from said hopper so as to accommodate bags of different weights.

10. A bagging device as claimed in claim 9 wherein said continuous bag material of a respective chute has an open end and a closed end, said closed end engaging a corresponding scale when sand from said hopper is dispensed through said respective chute and into said continuous bag material mounted thereto.

11. A bagging device as claimed in claim 10 further comprising means for sealing each said bag mounted to said portable support adjacent each of said pair of chutes, each sealing means including a cutting member adapted to sever one said discrete bag from said continuous bag material after receiving an amount of sand therein and to thermally seal said one discrete bag and said continuous bag material.

12. A bagging device as claimed in claim 11 wherein each means for sealing includes:

first and second piston assemblies connected to said portable support, each piston assembly including a piston and a rod;

a respective cutting member attached to said rod of said first piston assembly;

a respective sealing member attached to said rod of said second piston assembly;

each said rod reciprocatively movable in lateral directions wherein said respective cutting and sealing members are movable between a first spaced apart position allowing sand to pass into said continuous bagging material and a second position in which said respective cutting and sealing members bear against the other.

13. A bagging device as claimed in claim 9 wherein each of said pair of chutes includes a gate mounted above said continuous bag material therein, said gate selectably movable between a first open position and a second closed position for regulating the flow of particulate material through a respective chute into said continuous bag material.

14. A bagging device as claimed in claim 9 wherein said portable support is a trailer.

15. A bagging device as claimed in claim 9 wherein each of said pair of chutes includes a funnel having an offset portion for reducing the velocity and force of sand flowing through a respective chute.

* * * * *